(12) United States Patent
Yeh et al.

(10) Patent No.: US 7,095,544 B2
(45) Date of Patent: Aug. 22, 2006

(54) MICROMIRROR AND PRODUCTS USING THE SAME

(75) Inventors: Chih-Chieh Yeh, Taipei (TW);
Yuh-Hwa Chang, Shulin (TW);
Ching-Heng Po, Miaoli (TW);
Hsin-Chieh Huang, Chu Hsien (TW);
Jiann-Tyng Tzeng, Shiang Ilan (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 104 days.

(21) Appl. No.: 10/401,942

(22) Filed: Mar. 27, 2003

(65) Prior Publication Data

US 2004/0190108 A1    Sep. 30, 2004

(51) Int. Cl.
*G02B 26/00* (2006.01)
*G02F 1/29* (2006.01)

(52) U.S. Cl. .................. 359/290; 359/295; 359/298

(58) Field of Classification Search ........ 359/223–224, 359/290–292, 295, 298
See application file for complete search history.

(56) References Cited

U.S. PATENT DOCUMENTS

| | | | |
|---|---|---|---|
| 5,696,619 A * | 12/1997 | Knipe et al. ................ | 359/224 |
| 6,712,480 B1 * | 3/2004 | Leung et al. ................ | 359/846 |
| 6,741,383 B1 * | 5/2004 | Huibers et al. ............. | 359/291 |
| 6,778,315 B1 * | 8/2004 | Guo et al. ................... | 359/290 |
| 6,813,059 B1 * | 11/2004 | Hunter et al. ............... | 359/290 |
| 6,859,301 B1 * | 2/2005 | Islam et al. ................. | 359/291 |
| 6,891,655 B1 * | 5/2005 | Grebinski et al. .......... | 359/291 |
| 7,006,275 B1 * | 2/2006 | Huibers ....................... | 359/290 |
| 7,012,731 B1 * | 3/2006 | Huibers ....................... | 359/290 |
| 2002/0181110 A1 * | 12/2002 | Bower et al. ............... | 359/599 |
| 2004/0008402 A1 * | 1/2004 | Patel et al. ................. | 359/291 |
| 2004/0125346 A1 * | 7/2004 | Huibers ....................... | 353/98 |
| 2004/0125347 A1 * | 7/2004 | Patel et al. ................... | 353/98 |
| 2004/0130775 A1 * | 7/2004 | Grebinski et al. .......... | 359/291 |
| 2004/0218149 A1 * | 11/2004 | Huibers ....................... | 353/50 |
| 2004/0218154 A1 * | 11/2004 | Huibers ....................... | 353/97 |
| 2004/0233392 A1 * | 11/2004 | Huibers ....................... | 353/31 |
| 2004/0233505 A1 * | 11/2004 | Huibers et al. ............. | 359/291 |
| 2005/0111074 A1 * | 5/2005 | Huibers ....................... | 359/291 |
| 2005/0259311 A1 * | 11/2005 | Wang et al. ................. | 359/291 |

* cited by examiner

*Primary Examiner*—Evelyn A. Lester
(74) *Attorney, Agent, or Firm*—Tung & Associates

(57) ABSTRACT

A product comprising a micromirror comprising a reflective layer and a treatment layer overlying the reflective layer, and wherein the treatment layer comprises Ti.

10 Claims, 3 Drawing Sheets

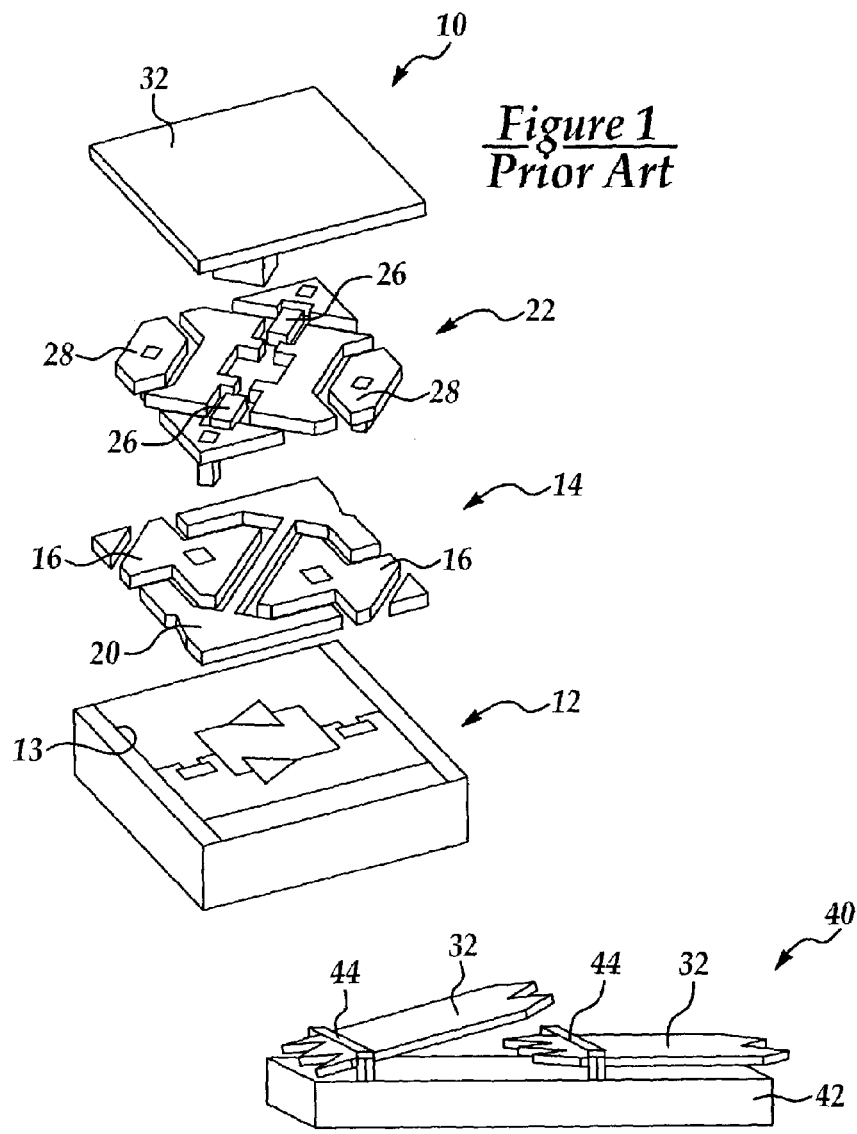
*Figure 1*
*Prior Art*
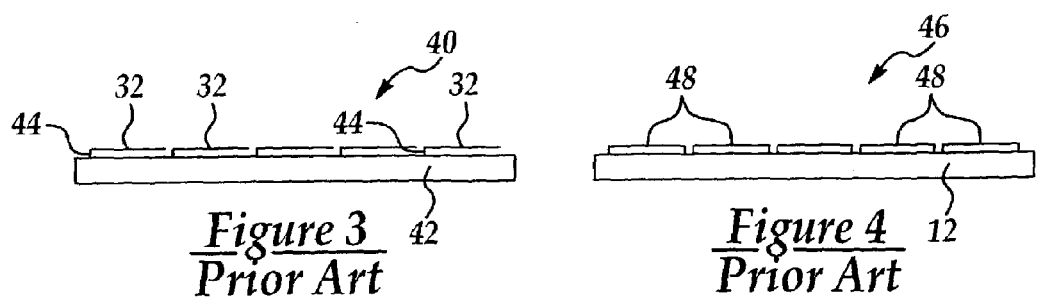
*Figure 2*
*Prior Art*
*Figure 3*
*Prior Art*
*Figure 4*
*Prior Art*

MICROMIRROR AND PRODUCTS USING THE SAME

FIELD OF THE INVENTION

This invention relates to micromirrors and products using the same, and more particularly to micromirrors, digital micromirror devices and projection systems.

BACKGROUND OF THE INVENTION

New advancements in projection systems utilize an optical semiconductor known as a digital micromirror device. A digital micrometer device chip may be the world's most sophisticated light switch. It contains an array from 750,000 to 1.3 million pivotally mounted microscopic mirrors. Each mirror many measure less than ⅕ of the width of a human hair and corresponds to one pixel in a projected image. The digital micromirror device chip can be combined with a digital video are graphic signal, a light source, and a projector lens so that the micromirrors reflect an all-digital image onto a screen or onto another surface.

Although there are variety of digital micromirror device configurations, typically micromirror are mounted on tiny hinges that enable each mirror to be tilted either toward the light source (on) in a projector system to reflect the light or away from the light source (off) creating a darker pixel on the projection surface. A bitstream to image code entering the semiconductor directs each mirror to switch on or off after several times per second. When the mirror is switched on more frequently than off the mirror reflects a light gray pixel. When the mirror is switched off more frequently than on the mirror reflects a darker gray pixel. Some projection systems can deflect pixels enough to generate 1024 shades of gray to convert the video are graphic signal entering the digital micromirror device into a highly detailed grayscale image. In some systems, light generated by a lamp passes through a color wheel as it travels to the surface of the digital micromirror device panel. The color wheel filters to light into red, green and blue. A single chip digital micromirror vice projector systems can create at least 16.7 million colors. When three digital micromirror device chips are utilized, more than 35 trillion colors can be produced. The on and off states of each micromirror are coordinated with the three basic building blocks of color, red, green and blue to produce a wide variety of colors.

Huibers et al U.S. Pat. No. 6,396,619 B1 discloses a deflectable spatial light modulator including a mirror plate that is substantially ridge and may be made up of a laminate having layers of silicon nitride and aluminum. In one embodiment, the mirror laminate may include a layer of aluminum sandwiched by two layers of silicon nitride. In other embodiments, include only a layer of aluminum and a layer of silicon nitride. Multi-layer arrangements with multiple layers of aluminum and/or silicon nitride are disclosed. The reference states that other materials besides aluminum (such as conductive and reflective metals) could be used. Other materials besides silicon nitride, such as silicon dioxide are also disclosed. The reference discloses that the silicon nitride layer may be 1400 Å thick and that the aluminum layer may be 700 Å thick. Disclosed also are one or more dielectric films, that act as a reflective coating, may be deposited on the mirror laminate to improve reflectivity.

A variety of digital micromirror devices (DMD) are known. FIG. 1 illustrates one embodiment of a prior art DMD that may be used in the present invention with the substitution of a unique mirror structure according to the present invention. As shown in FIG. 1, a DMD 10 may include a semiconductor device 12 such as a CMOS memory device that includes circuitry 13 that is used to activate an electrode(s) in response to a video or graphic signal. A first layer 14 is formed over the semiconductor device 12 and may include a yoke address electrode 16, and vias 18 formed therein down to the circuitry 13 on the semiconductor device 12, and a bias-reset bus 20. A second layer 22 is formed over the first layer 14 and may include a yoke 24 torsion hinge 26 and mirror address electrodes 28. A micromirror 32 is formed over the second layer 22 and positioned so that the micromirror 32 may be deflected diagonally when one of the electrodes 28 is activate by the semiconductor device 12. The micromirror include a reflective layer typically including aluminum. The DMD 10 shown in FIG. 1 while being an excellent engineering accomplishment is very complex, costly to manufacture and has low manufacturing yield. Further, the micromirror 32 may include defects as will be describe hereafter with respect to a second configuration of a DMD.

FIG. 2 illustrates a first subassembly 40 for a second type of DMD. The subassembly 40 may include a transparent layer 42 which may be any transparent material including, but not limited to, glass. A hinge 44 is formed on the transparent layer 44 and a micromirror 32 is secured thereto for pivotal movement with respect to the hinge 44 and the transparent layer 42.

FIG. 3 illustrates the first subassembly 40 including a plurality of micromirrors 32 each connected by a hinge 44 to the transparent layer 42. All of the component and subassemblies of the various DMD devices can be made by semiconductor or MEM micro processing techniques known to those skilled in the art.

FIG. 4 illustrates a second subassembly 46 of the second type of DMD and may include a semiconductor device 12 such as, but not limited to, a CMOS memory device. A plurality of electrodes 48, one for each micromirror 32 are formed over the semiconductor device 12 for communication with the circuitry (not shown) contained therein so that the electrode 48 may be selectively activated in response to a video or graphic signal.

FIG. 5 illustrates a DMD structure 10 that may be utilized by the present invention with the substitution of a unique micromirror according to the present invention. The DMD of FIG. 5 includes the first subassembly 40 flipped over and overlying the second subassembly 46 so the micromirrors 32 of the first subassembly 40 face and are closest to the electrodes 48 of the second subassembly 46. Spacers 50 are provided to position so that the micromirrors 32 are spaced a distance from the electrodes 48 and so that micromirror 32 is free to be defected or pivotally moved by the activation of an associated electrode 48. As illustrated in FIG. 5, when light is director on to the micromirrors 32, an electrode 48 associated with for each micromirror 32 may be activated cause the micromirror to pivotally move about the hinge 44. As a result, the light will be reflected or not depending on whether the electrode 48 associated with the micromirror 32 has be activated or not. As described above, depending on how fast and often a particular micromirror 32 is deflected by the electrode 48, the image projected by the micromirror 32 (pixel) will appear light or dark on the projection screen or other surface.

However, prior art micromirror structures often were troubled by the present of hillocks (raised features or bumps) 54 or voids 52 in the aluminum layer as shown in FIGS. 6 and 7. Typically the micromirror 32 include a sputtered on aluminum coating which may often include hillocks (raised features or bumps) 54 or voids 52. The hillocks 54 or voids 52 can cause artifacts or distortions in the projected image.

The present invention provides alternatives to and improvements over the micromirror, DMD and projection systems of the prior art.

SUMMARY OF THE INVENTION

One embodiment of the invention includes a product comprising a micromirror comprising a reflective layer and a treatment layer overlying the reflective layer, and wherein the treatment layer comprises Ti.

One embodiment of the invention includes a product including a micromirror wherein the treatment layer comprises TiN.

One embodiment of the invention includes a product including a micromirror wherein the reflective layer comprises at least one of aluminum and silver.

One embodiment of the invention includes a product including a micromirror wherein the reflective layer includes hillocks.

One embodiment of the invention includes a product including a micromirror wherein the reflective layer includes voids.

One embodiment of the invention includes a product including a micromirror wherein the reflective layer comprises Al, Si and Cu.

One embodiment of the invention includes a product including a micromirror wherein the treatment layer is 20–200 Å thick.

One embodiment of the invention includes a product including a micromirror wherein the treatment layer is 40–60 Å thick.

One embodiment of the invention includes a product including a micromirror and further comprising a first protective layer, and wherein the reflective layer overlies the first protective layer.

One embodiment of the invention includes a product including a micromirror wherein the first protective layer comprises silicon oxide.

One embodiment of the invention includes a product including a micromirror wherein the first protect layer comprise plasma enhanced silicon oxide.

One embodiment of the invention includes a product including a micromirror wherein and further comprising a second protective layer, and wherein the second protective layer overlies the treatment layer.

One embodiment of the invention includes a product including a micromirror wherein the second protective layer comprises silicon oxide.

One embodiment of the invention includes a product including a micromirror wherein the second protective layer comprises plasma enhanced silicon oxide.

One embodiment of the invention includes a product including a micromirror wherein the thickness of the second protective layer ranges from about 200 to about 1000 Å.

One embodiment of the invention includes a product including a micromirror wherein the thickness of the second protective layer ranges from about 200 to about 600 Å.

One embodiment of the invention includes a product including a micromirror wherein the thickness of the second protective layer ranges from about 400 to about 600 Å.

One embodiment of the invention includes a product including a micromirror and further comprising a semiconductor device, an electrode and a hinge, and wherein the micromirror is connected to the hinge for pivotal movement thereabout when the electrode is activated by the semiconductor device.

One embodiment of the invention includes a product comprising a micromirror comprising a reflective layer and a first protective layer overlying a first face of the reflective layer and a second protective layer overlying a second face of the reflective layer, and wherein the second protective layer comprises plasma enhance silicon dioxide having a thickness ranging from 200–1000 Å.

These and other embodiments of the present invention will become apparent from the following brief description of the drawings, detailed description of the preferred embodiments, and appended claims and drawings.

BRIEF DESCRIPTION OF THE DRAWINGS

FIG. 1 is an exploded view of a prior art digital micromirror device in which a micromirror according to the present invention may be incorporated.

FIG. 2 illustrates a prior art digital micromirror device subassembly in which a micromirror according to the present invention may be incorporated.

FIG. 3 illustrates a prior art digital micromirror device subassembly in which a micromirror according to the present invention may be incorporated.

FIG. 4 illustrates a prior art digital micromirror device subassembly.

DETAILED DESCRIPTION OF PREFERRED EMBODIMENTS

Figure 5:
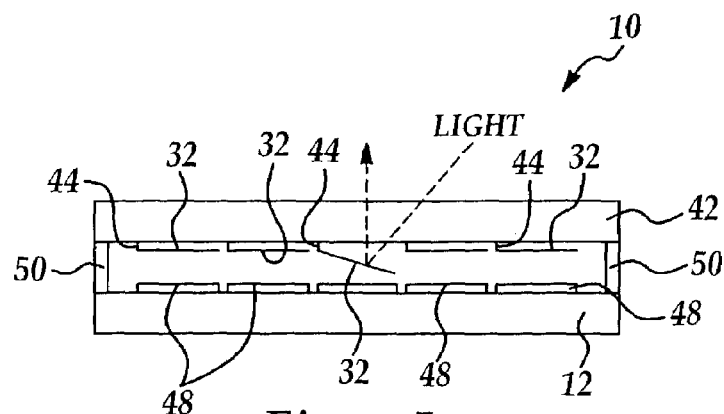
FIG. 5 is an exploded view of a prior art digital micromirror device in which a micromirror according to the present invention may be incorporated.
Figure 6:
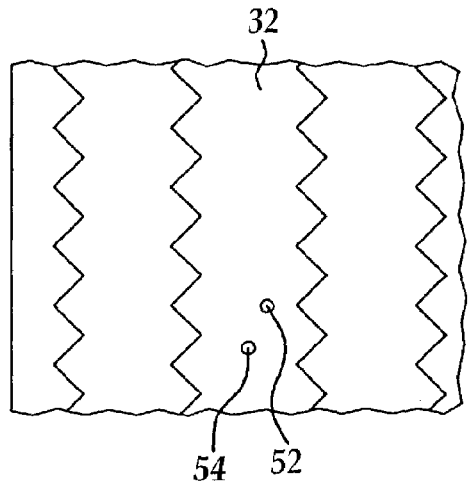
FIG. 6 illustrates a prior art micromirror having hillocks and voids.
Figure 7:
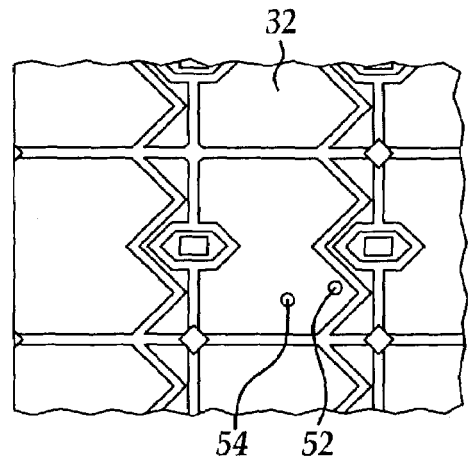
FIG. 7 illustrates a prior art micromirror having hillocks and voids.
Figure 8:
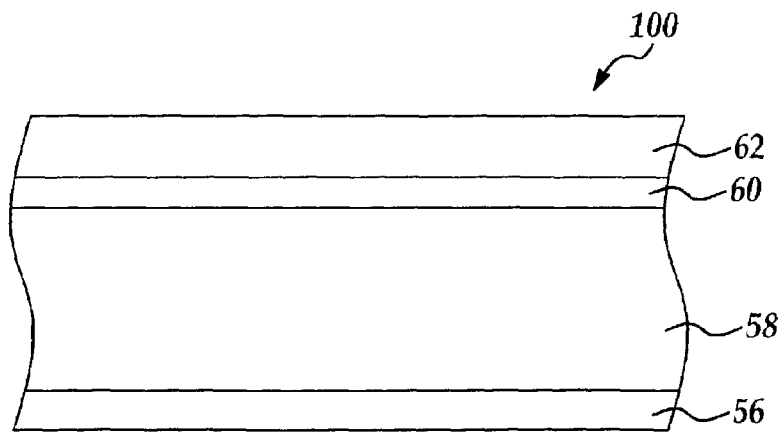
FIG. 8 illustrates a micromirror structure according to the present invention.

FIG. 8 illustrates a micromirror structure 100 according to the present invention. In one embodiment a micromirror 100 may include a first protective layer 56 which may be any known protective layer including, but not limited to, silicon nitride or silicon oxide or silicon oxynitride. In one embodiment, the first protective layer 56 includes plasma enhanced silicon oxide or silicon oxide. The first protective layer 56 may be present in any thickness including a thickness ranging from 200–600 Å.

The micromirror 100 may include a reflective layer 58 overlying the first protective layer 56. As used herein the description of a first layer "overlying" or "overlies" (or similar language) a second layer means that the first layer may be in direct contact with the second layer or that additional layers may be interposed between the first and second layers. The reflective layer 58 includes a light reflecting material such as, but not limited to, at least of aluminum or silver. In one embodiment the reflective layer 58 may be 2000–4000 Å (angstroms) thick, and preferably 2400–3000 Å thick and most preferably 2500 Å thick. In one embodiment the reflective layer 58 includes aluminum, silicon and copper. In another embodiment the reflective layer 58 includes 98.5 weight percent aluminum, 1 weight percent silicon and 0.5 weight percent copper. The reflective layer 58 may be formed by any method known to those skilled in the art, including screen printing, chemical vapor deposition, by securing a foil to the first protective layer 56, but preferably is formed by sputtering a reflective material onto the first protective layer 56 or onto another surface from which the reflective layer 58 can be removed.

The micromirror 100 may include a treatment layer 60 overlying the reflective layer 58. The treatment layer 60 include a material formed to a thickness sufficient to effectively eliminate or substantially reduce the effective number of hillocks and voids in the reflective layer 58 thereby reducing the number of artifacts and distorts produced in the projected image from the micromirror 100. Preferably the treatment layer 60 comprises at least one of Ti or TiN. The treatment layer 60 may be formed by any method known to those skilled in the art but preferably is sputtered onto the reflective layer 58 or onto a layer overlying the reflective layer 58. The treatment layer 60 may be present in any thickness including but not limited to 20–200 Å and preferably 40–60 Å and most preferably 50 Å thick. The treatment layer 60 may also provide stress relief or lubricating functions.

A second protective layer 62 may overlie the treatment layer 60. The second protective layer 62 may include but is not limited to silicon nitride, silicon oxide or silicon oxynitride. Preferably the second protective layer 62 is silicon oxide deposited by plasma enhanced methods to a thickness ranging from 200–1000 Å, preferably 200–600 Å and most preferably 400 Å thick. When the second protective layer 62 is PEOX (plasma enhanced silicon oxide) the micromirror has an improve reflectance compared to just the treatment layer 60 being present.

Figure 9:
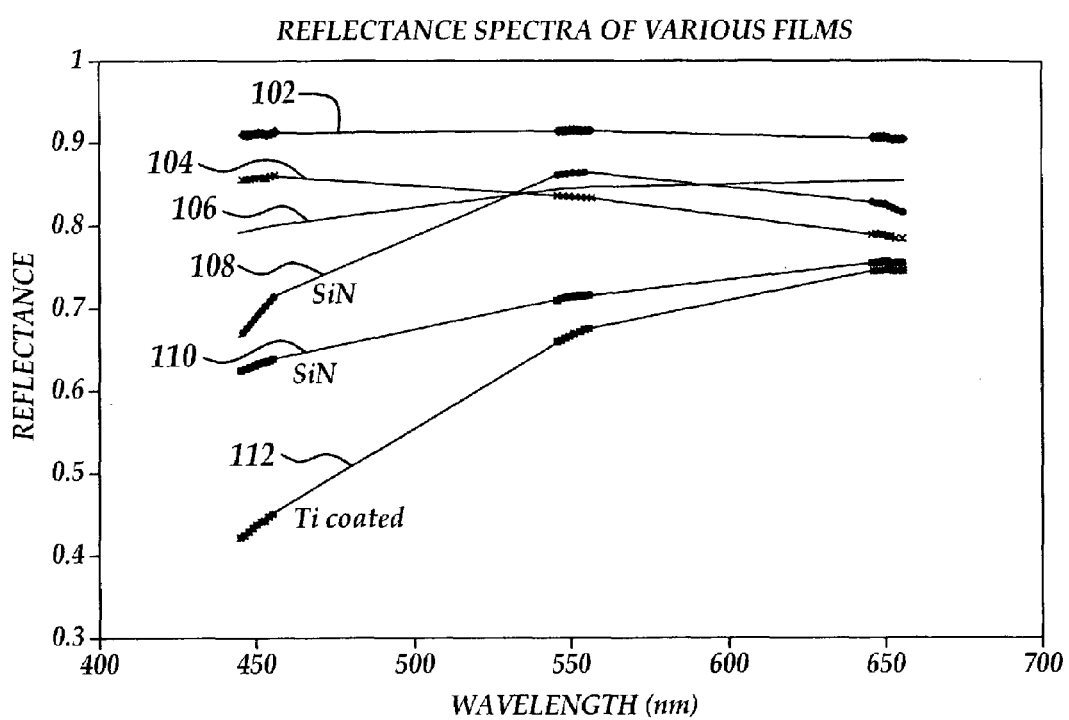
FIG. 9 is a graphic representation of the reflectance spectra of various micromirror films including a micromirror according to the present invention.

FIG. 9 is a graphic representation of the reflectance of a variety of films. Line 102 illustrates the reflectance of a AlSiCu film without a protective coating. Line 104 illustrates the reflectance of a AlSiCu film with a 1000 Å thick PEOX protective film. Line 106 illustrates the reflectance of a AlSiCu film with a 400 Å thick PEOX protective film. Line 108 illustrates the reflectance of a AlSiCu film with a 1000 Å thick SiN protective film. Line 110 illustrates the reflectance of a AlSiCu film with a 400 Å thick SiN protective film. Line 112 illustrates the reflectance of a AlSiCu film with a 50 Å thick Ti coating thereon. A protective coating of PEOX can retain 90 percent of the reflectance of a film.

The micromirror 100 may be substituted for the micromirror 32 shown in FIGS. 1 and 2 to create a DMD according to the present invention. The micromirror 100 may also be substituted for the micromirror shown in Huibers et al, U.S. Pat. No. 6,396,619 issued May 28, 2002, the disclosure of which is hereby incorporated by reference, to create a DMD according to the present invention

What is claimed is:

1. A product comprising:
    a micromirror comprising a reflective layer, a treatment layer overlying the reflective layer, and
    a first protective layer that comprises plasma enhanced silicon oxide wherein the reflective layer overlies the first protective layer.

2. A product as set forth in claim 1 wherein the first protective layer comprises silicon oxide.

3. A product as set forth in claim 1 further comprising a second protective layer, and wherein the second protective layer overlies the treatment layer.

4. A product as set forth in claim 3 wherein the second protective layer comprises silicon oxide.

5. A product as set forth in claim 3 wherein the second protective layer comprises plasma enhanced silicon oxide.

6. A product as set forth in claim 5 wherein the thickness of the second protective layer ranges from about 200 to about 1000 A.

7. A product as set forth in claim 5 wherein the thickness of the second protective layer ranges from about 200 to about 600 A.

8. A product as set forth in claim 3 wherein the thickness of the second protective layer ranges from about 400 to about 600 A.

9. A product as set forth in claim 1 further comprising a semiconductor device, an electrode and a hinge, and wherein the micromirror is connected to the hinge for pivotal movement thereabout when the electrode is activated by the semiconductor device.

10. A product comprising: a micromirror comprising a reflective layer and a first protective layer overlying a first face of the reflective layer and a second protective layer overlying a second face of the reflective layer, and wherein the second protective layer comprises plasma enhance silicon dioxide having a thickness ranging from 200–1000 A.

* * * * *